US009692640B1

(12) United States Patent
Veladanda et al.

(10) Patent No.: US 9,692,640 B1
(45) Date of Patent: Jun. 27, 2017

(54) DYNAMIC UPDATES TO A NETWORK SERVER

(71) Applicant: Symantec Corporation, Mountain View, CA (US)

(72) Inventors: Hari Veladanda, Pleasanton, CA (US); Hoa Ly, San Jose, CA (US); Gaurav Khanna, Sunnyvale, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 14/478,214

(22) Filed: Sep. 5, 2014

(51) Int. Cl.
*H04L 29/06* (2006.01)
*H04L 12/24* (2006.01)

(52) U.S. Cl.
CPC ...... *H04L 41/0803* (2013.01); *H04L 63/0823* (2013.01); *H04L 63/166* (2013.01); *H04L 67/42* (2013.01); *H04L 2463/041* (2013.01)

(58) Field of Classification Search
CPC ..... H04L 63/16; H04L 67/32; H04L 41/0803; H04L 63/166; H04L 63/0823; H04L 67/42
USPC ........................................................ 713/151
See application file for complete search history.

(56) References Cited

U.S. PATENT DOCUMENTS

2012/0204032 A1* 8/2012 Wilkins ................. H04L 9/006
713/170

OTHER PUBLICATIONS

Comparing Elliptic Curve Cryptography and RSA on 8-bit CPUs 2004.*
RFC 5246 The Transport Layer Security (TLS) Protocol 2008.*

* cited by examiner

*Primary Examiner* — Kambiz Zand
*Assistant Examiner* — Benjamin Kaplan
(74) *Attorney, Agent, or Firm* — Patterson + Sheridan, LLP

(57) ABSTRACT

Techniques are disclosed for configuring a server to establish a secure network communication session. An application monitors one or more resource utilization metrics of the server. Upon determining that at least one of the monitored resource metrics satisfies a specified condition, an optimization algorithm is selected based on the resource metrics and a configuration of the server. The optimization algorithm determines an updated configuration of the server while maintaining the security at par or better. The selected optimization algorithm is performed to modify determine the updated configuration of the server. Once determined, the application applies the updated configuration to the server.

17 Claims, 5 Drawing Sheets

DYNAMIC UPDATES TO A NETWORK SERVER

BACKGROUND

Field

Embodiments disclosed herein generally relate to Transport Layer Security (TLS) and Secure Sockets Layer (SSL), and more specifically, to updating server behavior during a TLS/SSL handshake protocol based on observed server resource metrics.

Description of the Related Art

Secure Sockets Layer (SSL) and its successor, Transport Layer Security (TLS), are network security protocols that enable privacy and data integrity for network packets between a server and a client. A server performs an SSL handshake protocol to establish a secure session with a client. The handshake protocol manages cipher suite negotiation between the server and the client. That is, the protocol determines which combination of cryptographic algorithms the server and client will use during the session, server authentication, and session key exchange. During this process, the server performs a number of cryptographic algorithms. Generally, these algorithms consume significant computing resources from the server.

Servers that primarily process SSL workloads may occasionally receive a high volume of client requests, which in turn over-burdens server computing resources. This is particularly true for web-servers that primarily rely on RSA-based digital certificates during the SSL handshake. Although RSA is well known, as server traffic increases, CPU utilization of the server also increases, which may cause the server to drop requests or requests to time out. Further, with security guidelines requiring a higher security, the key lengths for current encryption methods using RSA are expected to increase. However, RSA key lengths increase in size exponentially, which results in a greater amount of CPU and network resources consumed by the server.

Alternatives to RSA-based encryption methods may reduce the burden on the server during the SSL handshake protocol. For example, elliptic curve cryptography (ECC)-based certificates are less computation-intense on the server. While RSA key lengths increase exponentially, ECC key lengths increase linearly. For example, 128-bit security requires a 3,072-bit RSA key. In contrast, the same may be accomplished with a 256-bit ECC key. Consequently, ECC-based certificates may reduce the burden of CPU and network utilization. However, one issue with such an approach is that support for ECC is much less prevalent than support for RSA. That is, many clients may prefer RSA-based encryption over ECC-based encryption. Indeed, some clients lack support for ECC altogether. In addition, ECC-based methods may be computationally expensive for client devices having lower hardware specifications (e.g., mobile devices). Therefore, relying on an ECC-based solution entirely may be impractical.

SUMMARY

One embodiment presented herein provides a method for managing network communication sessions on a server. This method generally includes monitoring one or more resource utilization metrics of the server. Upon determining that at least one of the monitored resource metrics satisfies a specified condition, an optimization algorithm based on the resource metrics and a configuration of the server is selected. The optimization algorithm determines an updated configuration of the server. The method also includes performing the selected algorithm to determine the updated configuration of the server. The updated configuration is applied to the server.

In a particular embodiment, the configuration of the server may include a preferred cipher suite, preferred digital certificate type, a session resumption validity interval, or a length of cryptographic keys generated by the server when the network communication session is established. Further, applying the updated configuration may include modifying the preferred cipher suite of the server from an RSA-based cipher suite to an elliptic curve cryptography (ECC)-based cipher suite and modifying the preferred digital certificate type from an RSA-based digital certificate to an ECC-based digital certificate. In a particular embodiment, applying the updated configuration includes modifying the length of the cryptographic keys or the session resumption validity interval.

Still another embodiment includes a computer-readable storage medium storing instructions, which, when executed on a processor, perform an operation for managing network communication sessions on a server. The operation itself may include monitoring one or more resource utilization metrics of the server. Upon determining that at least one of the monitored resource metrics satisfies a specified condition, an optimization algorithm is selected based on the resource metrics and a configuration of the server. The optimization algorithm determines an updated configuration of the server. This operation also includes performing the selected optimization algorithm to determine the updated configuration of the server and applying the updated configuration to the server.

Still another embodiment includes a system having a processor and a memory a memory storing one or more application programs configured to perform an operation for managing network communication sessions on a server. The operation itself may include monitoring one or more resource utilization metrics of the server. Upon determining that at least one of the monitored resource metrics satisfies a specified condition, an optimization algorithm is selected based on the resource metrics and a configuration of the server. The optimization algorithm determines an updated configuration of the server. This operation also includes performing the selected optimization algorithm to determine the updated configuration of the server and applying the updated configuration to the server.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
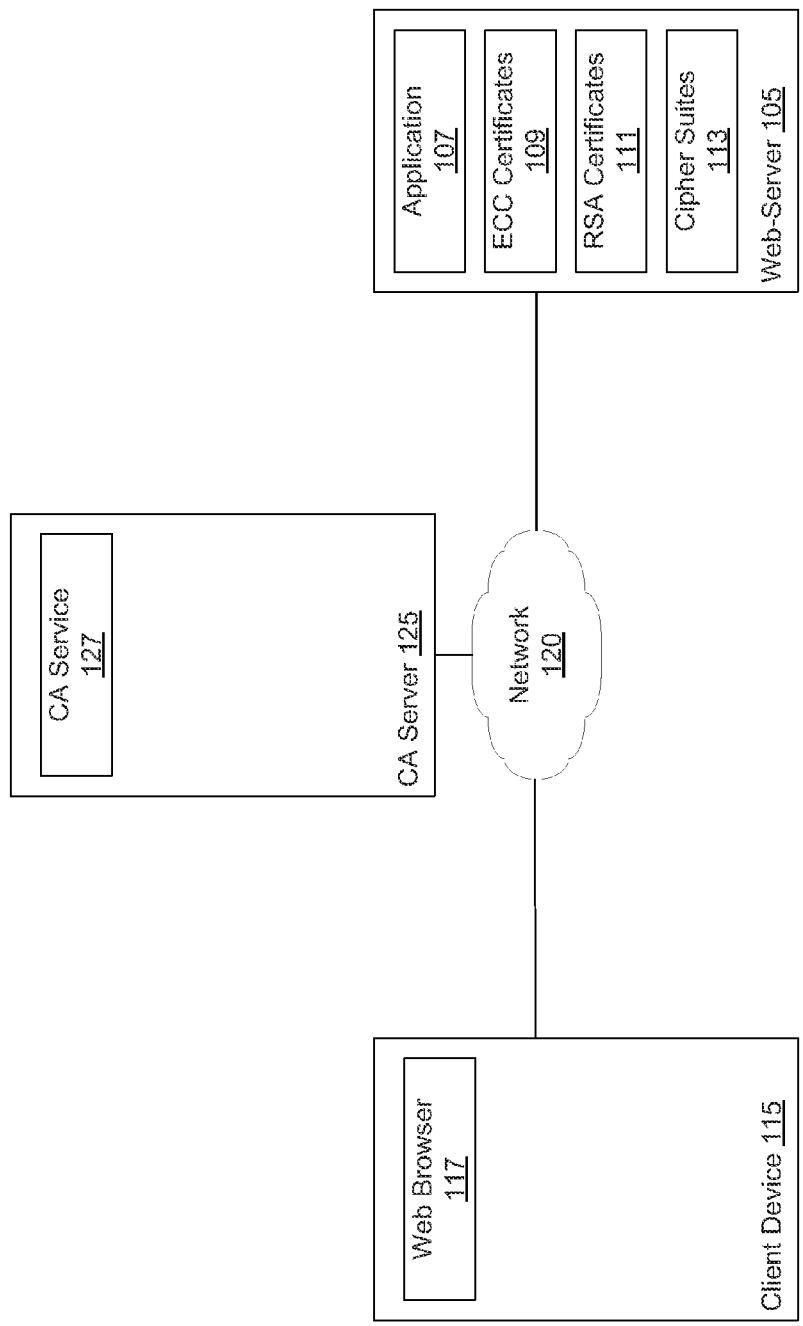
FIG. 1 illustrates an example computing environment, according to one embodiment.

Generally, RSA-based encryption methods are computation-intensive and require significant computing resources. Web-servers (or other servers) that use RSA-based encryption methods for SSL, particularly for a handshake protocol, may drop requests or allow requests to time out during high traffic periods or where CPU utilization of the web-server is high. While elliptic curve cryptography (ECC)-based encryption methods may consume fewer resources than RSA-based methods, the resource burden on the client can sometimes be significant, e.g., earlier generation mobile devices limited in hardware and the like.

Embodiments presented herein provide techniques for dynamically updating a web-server based on observed server metrics. More specifically, an application executing on the web-server monitors metrics such as CPU utilization, memory, and network I/O. The application may include several thresholds associated with the metrics. When a given metric crosses a threshold specified in a condition, the application evaluates a current resource usage state of the web-server and determines an appropriate SSL handshake protocol optimization to perform.

For example, assume that an average CPU utilization level greater than 60% satisfies a specified condition. The application monitors the web-server and observes that the average CPU utilization level is currently at a level of approximately 65%, which may indicate that the web-server has a high amount of client connection requests that include an SSL handshake. In response, the application evaluates current resource usage of the web-server as well as a current configuration, such as whether the web-server is using RSA-based digital certificates for the SSL handshake protocol, the length of the keys generated, etc. Based on the evaluation, the application determines a handshake protocol optimization. One such configuration may result in switching from RSA-based digital certificates to ECC-based certificates and cipher suites, given the high resource usage. Another optimization may be to adjust the key length or hashing algorithm used. Further, continuing the previous example, assume an average CPU utilization of less than 45% satisfies another specified condition. A possible configuration resulting from an optimization may switch from ECC-based certificates to RSA-based certificates.

The application supplies the determined configuration to the web-server. In turn, the web-server configures the web-server as specified in the supplied configuration. In one embodiment, the application continues to monitor resource metrics and adjust behavior even after the change. For example, a threshold may be in place that allows the application to detect a significant reduction in CPU utilization. In response to such a reduction, the application may identify an optimization that specifies a switch from ECC-based certificates to RSA-based certificates.

The application dynamically detects changes in resource usage and automatically adjusts the behavior of the web-server to manage resources more efficiently for SSL handshake protocols. Advantageously, through observing usage metrics and evaluating the state of the web-server, the application may cause a web-server experiencing heavy client load to switch from a RSA-based digital certificates to less resource-intensive ECC-based digital certificates. And because ECC-based algorithms may be computationally expensive for some earlier generation client devices, the application may revert back to RSA-based digital certificates once the metrics indicate that the server load has decreased.

Note, the following description relies on a web-server that supports SSL and TLS protocols as a reference example for updating a handshake protocol configuration based on observed resource metrics of the server. However, one of skill in the art will recognize that embodiments are applicable in other contexts relating to observing resource metrics of a network server, determining an optimization algorithm, and performing the algorithm to update the configuration of the network server for establishing a connection between the server and a client, regardless of protocol used.

FIG. 1 illustrates an example computing environment 100, according to one embodiment. As shown, the computing environment 100 includes a web-server 105, a client device 115, and a certificate authority (CA) server 125, each connected via a network 120.

The CA server 125 provides a CA service 127 that issues digital certificates, e.g., to the web-server 105. Generally, digital certificates issued by the CA service 127 allow the client device 115 to establish a secure connection with the web-server 105. The encryption keys for digital certificates may be generated for use with a variety of encryption schemes, such as RSA, Digital Signature Algorithm (DSA), ECC, or combinations of each. Further, the CA server 125 may provide a variety of ancillary services such as Online Certificate Status Protocol (OCSP) and Certificate Revocation List (CRL) services.

The web-server 105 may be a physical computing system or a virtual machine instance in a computing cloud. Examples of well-known web-server applications include Apache Web Server, Internet Information Services (IIS) for Windows, nginx, etc. In one embodiment, the web-server 105 supports the SSL and TSL protocols. The web-server 105 includes one or more cipher suites 113 used to negotiate security settings for a network connection with a client device 115. The web-server 105 may also include ECC certificates 109 and RSA certificates 111 issued by the CA server 125.

The client device 115 may be a physical computing system (e.g., a desktop computer, laptop computer, mobile device, etc.) or a virtual machine instance in a computing cloud. The client device 115 includes a web browser or any other client application 117 that supports the SSL and TSL protocols.

The web browser application 117 establishes a secure (i.e., encrypted) connection with the web-server 105 by initiating a SSL handshake protocol. The SSL handshake protocol specifies parameters for a communication channel between the client device 115 and the web-server 105. The handshake protocol allows the web-server and client to negotiate a cipher suite 113 to use between the server and client, an authentication of the server (and the client, if applicable), and exchange of session key information. Generally, the use of an RSA-based cipher suite 113 and RSA certificates 111 tends to be more computationally-intense on the web-server 105 (when compared to the use of an ECC-based cipher suite 113 and ECC certificates 109). Conversely, ECC-based cipher suites 113 can be more computationally-intense during the handshake process than RSA-based cipher suites 113 for a client device 115.

In one embodiment, the web-server 105 includes an application 107. The application 107 updates behavior of the web-server 105 relative to the SSL handshake protocol, based on metrics observed in the web-server 105. More specifically, the application 107 observes system usage metrics such as CPU utilization percentages, network I/O, memory usage, and so on. Doing so allows the application 107 to ascertain the resource demands of the web-server 105.

Further, the application 107 may specify conditions for the metrics, such that if a given metric (or group of metrics) satisfies a specified condition, then the application 107 modifies the handshake behavior of the web-server 105. The application 107 does so based on learning and optimization algorithms that evaluate the current resource state of the web-server 105 and make decisions that result in more efficient use of server resources. For example, the application 107 may detect that CPU utilization or network I/O of the web-server 105 is over a given value specified in the condition. In response, the application 107 may alter the behavior of the web-server 105 by, e.g., switching handshake protocol preference for an RSA-based cipher suite 113 to an ECC-based cipher suite 113, changing the length of the cryptographic keys generated, changing the hashing algorithms used, etc.

Although FIG. 1 depicts the application 107 as executing on the web-server 105, the application 107 may execute from a computer system separate from the web-server 105. For instance, the application 107 may execute on a virtual computing instance that receives metrics information from the web-server 107.

Figure 2:
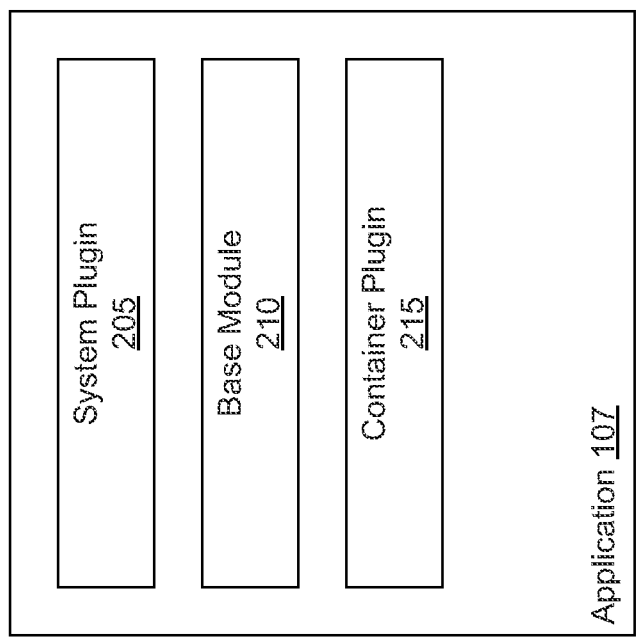
FIG. 2 further illustrates the server application described in FIG. 1, according to one embodiment.

FIG. 2 further illustrates the application 107 described in FIG. 1, according to one embodiment. As shown, the application 107 includes a system plugin 205, a base module 210, and a container plugin 215. Note, although each component is depicted as being part of one application, the components may be divided into separate modules executing on separate systems.

In one embodiment, the system plugin 205 observes system usage metrics of the web-server 105. Examples of such usage metrics include CPU usage, memory usage, network I/O, and cache utilization. Further, the system plugin 205 detects whether a given metric (or group of metrics) triggers a threshold condition. For example, the system plugin 205 may specify threshold conditions for average CPU utilization percentage at certain values, e.g., if the CPU utilization percentage is above X, or if the average CPU utilization percentage is below Y.

Further, because of the variety infrastructure and operating system combinations available (e.g., as ESX, Amazon Web Services, Xen, Windows, Linux, Solaris, etc.), methods for obtaining metrics from a given server can differ. The system plugin 205 is a pluggable framework that may be customized to be compatible for a given server. For example, one system plugin 205 may be configured to observe metrics for a web-server configured with the Linux operating system, while another system plugin 205 may be configured to observe metrics for a web-server on a paravirtualized Amazon Web Services Linux instance.

When a given threshold condition is triggered (or in response to a request from the base module 210), the system plugin 205 relays current usage information to the base module 210. The container plugin 215 may also relay current SSL handshake protocol configuration (e.g., information regarding cipher suites used in the handshake process, the size of keys generated, hashing algorithms used, etc.) to the base module 210. In one embodiment, the base module 210 provides a set of optimization algorithms and heuristic rules used to modify the behavior of the web-server 105 relative to the SSL handshake protocol. The base module 210 makes inferences based on the information output by the system plugin 205 (and container plugin 215) and evaluates possible resource conservation limits for each of the optimization algorithms. Based on the evaluation, the base module 210 selects an optimization algorithm to apply to the web-server.

Continuing the previous example, assume the system plugin 205 detects that the average CPU utilization percentage of the web-server 105 is approximately 70%, indicating a relatively high load on the server. The high utilization percentage triggers the threshold condition described above. The system plugin 205 sends the system usage information and the container plugin 215 sends the SSL handshake configuration to the base module 210. In turn, the base module 210 may apply heuristic rules to the information obtained. Doing so allows the base module 210 to estimate resource conservation limits and possible configurations resulting from performing each of the optimization algorithms. The base module 210 may persist the estimations for later use.

The base module 210 may identify an algorithm based on heuristics for selecting the most resource efficient solution for the web-server 105. For instance, if the web-server 105 currently uses an RSA-based cipher suite in the SSL handshake protocol, the base module 210 may determine that an algorithm that switches to an ECC-based cipher suite may reduce the average CPU utilization percentage.

In one embodiment, the container plugin 215 receives the selection of an algorithm from the base module 210. The container plugin 215 performs the selected algorithm to update the configuration the server. Because of the variety of web-servers available, the container plugin 215 may be customized for the particular web-server application (e.g., Apache, nginx, etc.) installed on web-server 105.

Once enabled, the system plugin 205 continues to observe system metrics. Thus, in the previous example, if the average CPU utilization percentage drops as a result of applying the previously selected algorithm, the base module 210 may then select an optimization algorithm that leverages the utilization reduction, e.g., by switching back to the RSA-based cipher suite to avoid over-burdening resource usage for client devices with comparatively lesser hardware specifications.

Figure 3:
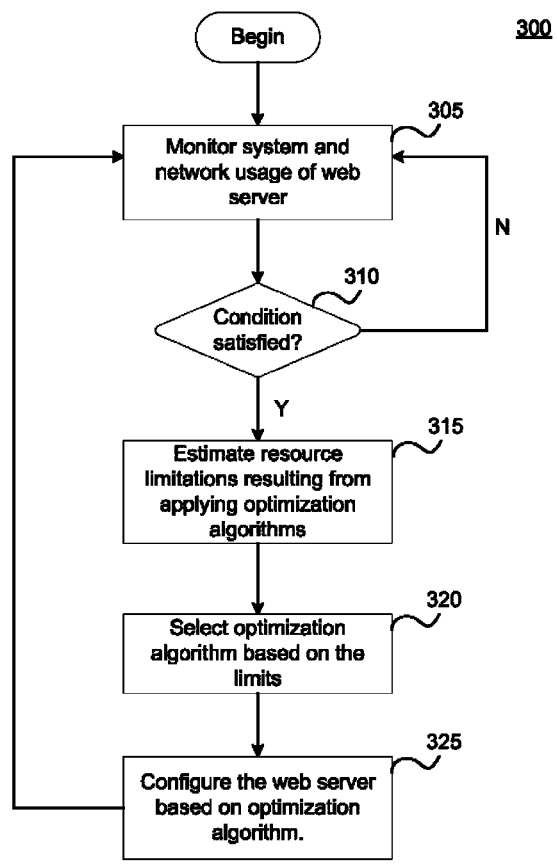
FIG. 3 illustrates a method for updating SSL handshake behavior of a web-server based on observed server metrics, according to one embodiment.

FIG. 3 illustrates a method 300 for dynamically updating a network server based on observed server metrics, according to one embodiment. As shown, method 300 begins at step 305, where the system plugin 205 observes system and network usage occurring on the web-server 105. As stated, the system plugin 205 may retrieve a variety of metrics, such as CPU usage, memory usage, dropped requests, connection timeouts, etc. of the web-server 215 as well as for the individual web server process. For example, assume that the system plugin 205 observes that CPU utilization has crossed a given threshold. Further assume that the TCP buffer is nearing a threshold and if not corrected might drop a number of client requests.

At step 310, the system plugin 205 determines whether any defined threshold conditions have been satisfied. Continuing the previous example, assume that a given threshold condition specifies an average CPU utilization percentage of over 65%. Assume that the system plugin 205 indicates that the current average is only 60%. In such a case, if no other thresholds have been triggered, then the system plugin 205 returns to step 305 to continue monitoring the usage metrics of the web-server 105. However, assume that another threshold condition specifies TCP buffer to be X and within a Y duration. Further assume that the system plugin 205 indicates that the web-server 205 is unable to catch up with the client requests and the buffer is X within the Y duration. In such a case, the threshold condition has been triggered.

The system plugin 205 sends the usage metrics information to the base module 210. In addition, the base module 210 may receive current SSL handshake configuration as well from the container plugin 215. The base module 210 evaluates the resource usage of the web server based on the usage metrics sent by the system plugin 205 and the current SSL configuration extracted from the container plugin 215.

At step 315, the base module 210 may predict resource limitations that may result from applying each of the optimization algorithms based on the current state of resource usage. Continuing the previous example, given the amount of dropped requests within a specified time frame, the base module 210 may determine that the web-server 205 is currently experiencing a high load of server requests. The base module 210 may also determine that a current handshake configuration of RSA-based certificates being used may be burdening system resources, contributing to the amount of dropped requests.

At step 320, the base module 210 selects an optimization algorithm based on the current state of the web-server 105 and the predicted resource limitations. For example, after determining that the average CPU utilization is high and that the current configuration specifies that the web-server 105 is using RSA-based certificates, the base module 210 may select an algorithm that alters the handshake configuration to use ECC-based certificates instead of RSA-based ones in instances where the client device supports ECC. Alternatively, the base module 210 may select an optimization algorithm that adjusts key lengths or hashing algorithms used instead.

The base module 210 sends the selected algorithm to the container plugin 215. At step 325, the container plugin 215 performs the algorithm to update the configuration of the web-server 105. Once complete, the system plugin 205 continues to observe system and network metrics of the web-server 105.

Figure 4:
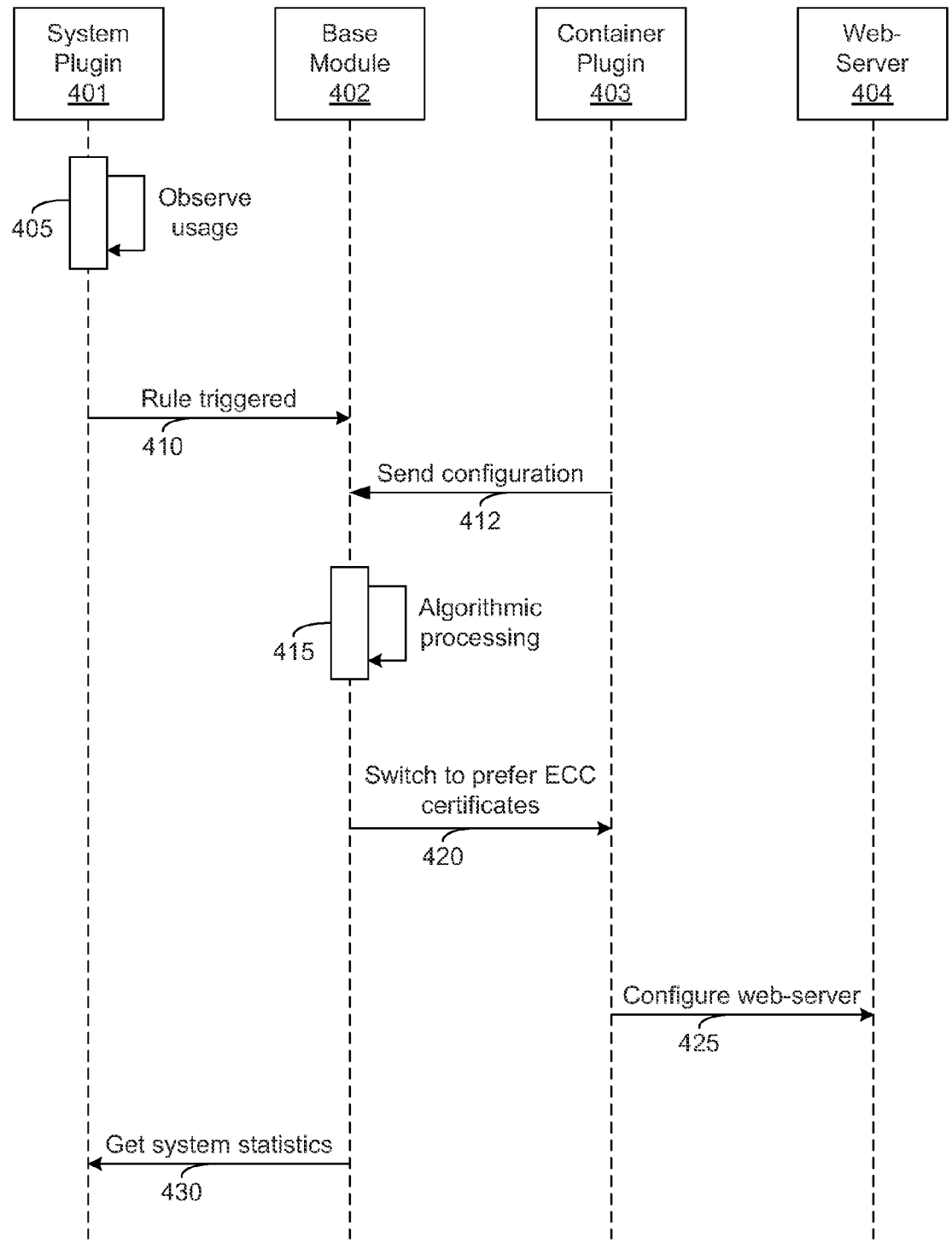
FIG. 4 illustrates an example sequence for updating SSL handshake protocol behavior of a web-server to use ECC-based algorithms based on observed server metrics, according to one embodiment.

FIG. 4 illustrates an example sequence for dynamically updating a web-server. More specifically, the sequence describes interactions between a monitoring component 401, a base module 402, a container plugin 403, and the web-server 404 in switching from RSA-based algorithms as a preferred cipher suite to ECC-based algorithms.

At 405, the system plugin 401 observes usage metrics. The usage metrics may trigger a given condition, e.g., in average CPU utilization being greater than an amount X. Such a trigger may indicate that the system resources of the web-server 404 are currently being burdened with many client SSL connection requests.

At 410, the system plugin 401 relays to the base module 402 that a specified condition has been satisfied. At 412, the container plugin 403 sends the current configuration of the web-server 404 to the base module 402. At 415, the base module 402 undergoes algorithm processing, i.e., selects an adaptive algorithm based on the information provided by the system plugin 401 and the container plugin 403. The base module 402, based on the information provided, selects an algorithm that switches to an ECC-based cipher suite.

At 420, the base module 402 sends the selection to the container plugin 403. At 425, the container plugin 403 invokes the algorithm on the web-server 404. The SSL handshake configuration on the web-server 404 is modified to prefer an ECC-based cipher suite. Thus, when a client initiates the handshake protocol with the web-server 404, and if the client supports ECC-based algorithms, the web-server 404 selects the ECC-based cipher suite. At 430, the base module 402 retrieves system statistics from the system plugin 401.

Figure 5:
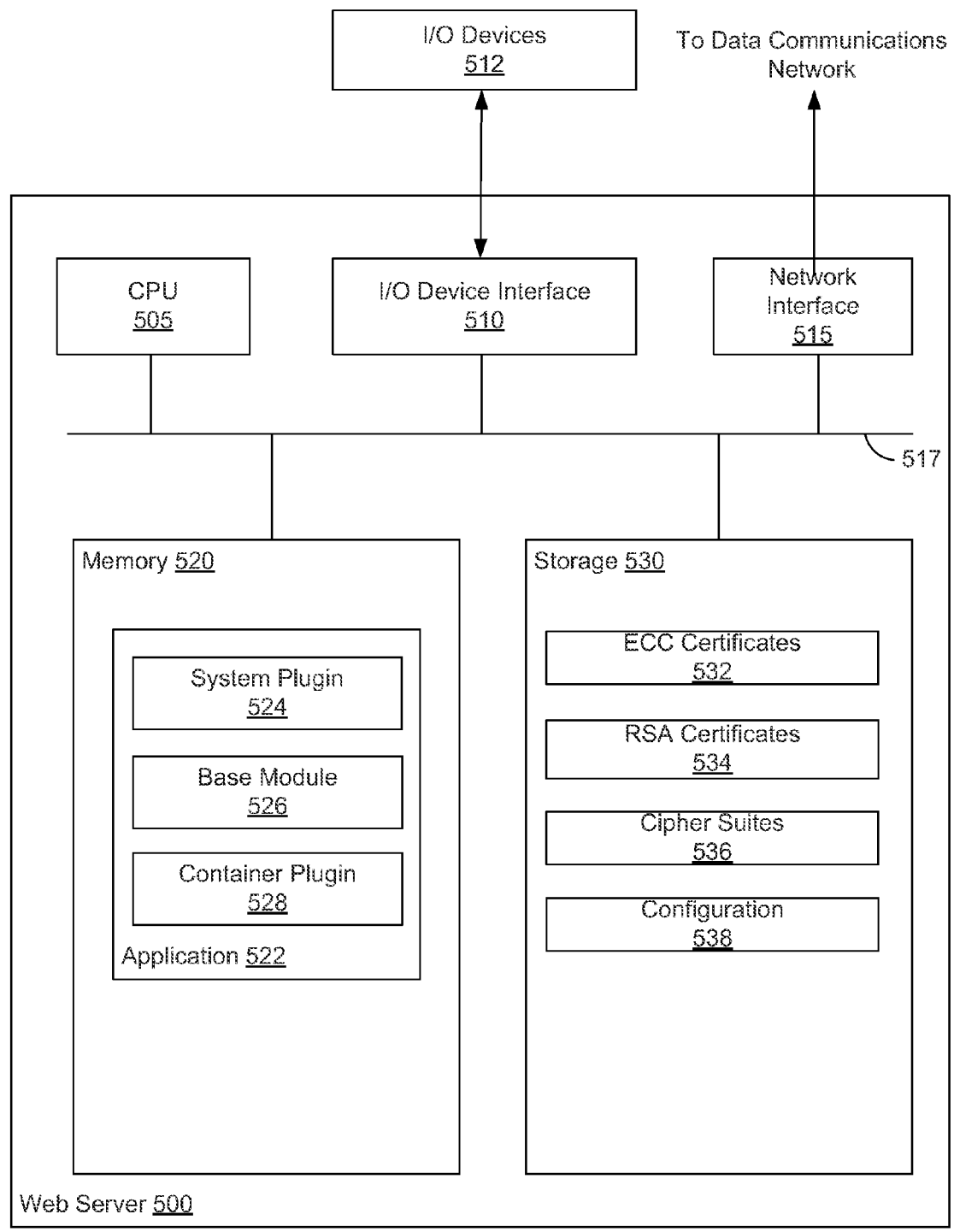
FIG. 5 illustrates an example web-server configured to update SSL handshake protocol behavior of a web-server, according to one embodiment.

FIG. 5 illustrates an example web-server 500 configured to dynamically update SSL handshake protocol behavior based on observed system usage metrics, according to one embodiment. As shown, the computing system 500 includes, without limitation, a central processing unit (CPU) 505, a network interface 515, a memory 520, and storage 530, each connected to a bus 517. The computing system 500 may also include an I/O device interface 510 connecting I/O devices 512 (e.g., keyboard, mouse, and display devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Illustratively, the memory 520 includes an application 522. The storage 530 includes a ECC certificates 532, RSA certificates 534, and cipher suites 536. The application 522 is configured to update the web-server 500 based on observed usage statistics of the server 500. The application 522 itself includes a system plugin 524, a base module 526, and a container plugin 528.

The system plugin 524 receives metrics of the web-server 500, such as CPU usage, memory usage, network I/O, cache utilization, etc. Further, the system plugin 524 includes a variety of conditions that, when satisfied, cause the system plugin 524 to report the system usage and the container plugin 528 to send SSL handshake configuration 538 to the base module 526. The base module 526 selects one of the optimization algorithms based on the currently observed metrics, configuration information, and heuristic rules. The base module 526 sends the selection to the container plugin 528. The container plugin 528 applies the algorithm to the web-server 500.

In the preceding, reference is made to embodiments of the invention. However, the disclosure is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for managing network communication sessions on a server, the method comprising:
   monitoring one or more resource utilization metrics of the server;
   upon determining that at least one of the monitored resource metrics satisfies a specified condition, selecting an optimization algorithm based on the resource metrics and a configuration of the server, wherein the optimization algorithm determines an updated configuration of the server used in establishing secure network communication sessions;
   performing the selected optimization algorithm to determine the updated configuration of the server, wherein the updated configuration of the server includes an update to one or more of a preferred cipher suite, a preferred digital certificate type, a session resumption validity interval, and a length of cryptographic keys generated by the server used in establishing secure network communication sessions; and
   applying the updated configuration to the server.

2. The method of claim 1, wherein applying the updated configuration modifies the preferred cipher suite of the server from an RSA-based cipher suite to an elliptic curve cryptography (ECC)-based cipher suite and modifies the preferred digital certificate type from an RSA-based digital certificate to an ECC-based digital certificate.

3. The method of claim 1, wherein applying the updated configuration modifies the length of the cryptographic keys or the session resumption validity interval.

4. The method of claim 1, wherein the network communication is established by a Secure Sockets Layer (SSL) or Transport Layer Security (TLS) handshake protocol.

5. The method of claim 1, wherein the resource utilization metrics include at least one of an average CPU utilization, network I/O statistics, memory usage statistics, and cache utilization.

6. The method of claim 1, wherein selecting the optimization algorithm comprises:
   estimating resource usage limitations that would result from performing each one of a plurality of optimization algorithms to the server;
   identifying, from the plurality, one of the optimization algorithms based on the estimated resource usage limitations and the configuration of the server; and
   persisting the estimated resource usage limitations.

7. A non-transitory computer-readable storage medium storing instructions, which, when executed on a processor, performs an operation for managing network communication sessions on a server, the operation comprising:

monitoring one or more resource utilization metrics of the server;

upon determining that at least one of the monitored resource metrics satisfies a specified condition, selecting an optimization algorithm based on the resource metrics and a configuration of the server, wherein the optimization algorithm determines an updated configuration of the server used in establishing secure network communication sessions;

performing the selected optimization algorithm to determine the updated configuration of the server, wherein the updated configuration of the server includes an update to one or more of a preferred cipher suite, a preferred digital certificate type, a session resumption validity interval, and a length of cryptographic keys generated by the server used in establishing secure network communication sessions; and applying the updated configuration to the server.

8. The non-transitory computer-readable storage medium of claim 7, wherein applying the updated configuration modifies the preferred cipher suite of the server from an RSA-based cipher suite to an elliptic curve cryptography (ECC)-based cipher suite and modifies the preferred digital certificate type from an RSA-based digital certificate to an ECC-based digital certificate.

9. The non-transitory computer-readable storage medium of claim 7, wherein applying the updated configuration modifies the length of the cryptographic keys or the session resumption validity interval.

10. The non-transitory computer-readable storage medium of claim 7, wherein the network communication is established by a Secure Sockets Layer (SSL) or Transport Layer Security (TLS) handshake protocol.

11. The non-transitory computer-readable storage medium of claim 7, wherein the resource utilization metrics include at least one of an average CPU utilization, network I/O statistics, memory usage statistics, and cache utilization.

12. The non-transitory computer-readable storage medium of claim 7, wherein selecting the optimization algorithm comprises:

estimating resource usage limitations that would result from performing each one of a plurality of optimization algorithms to the server;

identifying, from the plurality, one of the optimization algorithms based on the estimated resource usage limitations and the configuration of the server; and persisting the estimated resource usage limitations.

13. A system, comprising:

a processor; and a memory storing one or more application programs configured to perform an operation for managing network communication sessions on a server, the operation comprising:

monitoring one or more resource utilization metrics of the server, upon determining that at least one of the monitored resource metrics satisfies a specified condition, selecting an optimization algorithm based on the resource metrics and a configuration of the server, wherein the optimization algorithm determines an updated configuration of the server used in establishing secure network communication sessions, performing the selected optimization algorithm to determine the updated configuration of the server, wherein the updated configuration of the server includes an update to one or more of a preferred cipher suite, a preferred digital certificate type, a session resumption validity interval, and a length of cryptographic keys generated by the server used in establishing secure network communication sessions, and applying the updated configuration to the server.

14. The system of claim 13, wherein applying the updated configuration modifies the preferred cipher suite of the server from an RSA-based cipher suite to an elliptic curve cryptography (ECC)-based cipher suite and modifies the preferred digital certificate type from an RSA-based digital certificate to an ECC-based digital certificate.

15. The system of claim 13, wherein applying the updated configuration modifies the length of the cryptographic keys or the session resumption validity interval.

16. The system of claim 13, wherein the resource utilization metrics include at least one of an average CPU utilization, network I/O statistics, memory usage statistics, and cache utilization.

17. The system of claim 13, wherein selecting the optimization algorithm comprises:

estimating resource usage limitations that would result from performing each one of a plurality of optimization algorithms to the server;

identifying, from the plurality, one of the optimization algorithms based on the estimated resource usage limitations and the configuration of the server; and persisting the estimated resource usage limitations.

\* \* \* \* \*